US012774383B2

(12) United States Patent
Elgimiabi et al.

(10) Patent No.: US 12,774,383 B2
(45) Date of Patent: Oct. 27, 2026

(54) STRUCTURAL ADHESIVE HAVING SUPERIOR COMPRESSION PROPERTIES

(71) Applicant: 3M INNOVATIVE PROPERTIES COMPANY, St. Paul, MN (US)

(72) Inventors: Sohaib Elgimiabi, Duesseldorf (DE); Stefan Spiekermann, Neuss (DE); Florian Szillat, Neuss (DE)

(73) Assignee: 3M Innovative Properties Company, St. Paul, MN (US)

( * ) Notice: Subject to any disclaimer, the term of this patent is extended or adjusted under 35 U.S.C. 154(b) by 641 days.

(21) Appl. No.: 18/258,661

(22) PCT Filed: Dec. 21, 2021

(86) PCT No.: PCT/IB2021/062110
§ 371 (c)(1),
(2) Date: Jun. 21, 2023

(87) PCT Pub. No.: WO2022/137122
PCT Pub. Date: Jun. 30, 2022

(65) Prior Publication Data

US 2024/0110056 A1 Apr. 4, 2024

(30) Foreign Application Priority Data

Dec. 21, 2020 (EP) .................................... 20216247

(51) Int. Cl.

| | |
|---|---|
| ***C09J 163/00*** | (2006.01) |
| ***C08G 59/50*** | (2006.01) |
| ***C08G 59/56*** | (2006.01) |
| ***C08L 63/00*** | (2006.01) |

(52) U.S. Cl.
CPC ............ *C08L 63/00* (2013.01); *C09J 163/00* (2013.01)

(58) Field of Classification Search
None
See application file for complete search history.

(56) References Cited

U.S. PATENT DOCUMENTS

| | | | | |
|---|---|---|---|---|
| 2013/0255879 | A1* | 10/2013 | Bieber | C08G 59/186 523/400 |
| 2016/0152879 | A1 | 6/2016 | Elgimiabi et al. | |

FOREIGN PATENT DOCUMENTS

| | | | | |
|---|---|---|---|---|
| EP | 2818492 A1 | 4/2018 | | |
| EP | 3275913 A1 | 11/2021 | | |
| WO | 2010091395 A1 | 8/2010 | | |
| WO | 2013151835 A1 | 10/2013 | | |
| WO | WO-2019005800 A1 * | 1/2019 | | C08G 59/5013 |
| WO | 2021124049 A1 | 6/2021 | | |

OTHER PUBLICATIONS

International Search Report for PCT International Application No. PCT/IB2021/062110, mailed on Mar. 25, 2022, 3 pages.

* cited by examiner

*Primary Examiner* — Michael J Feely
(74) *Attorney, Agent, or Firm* — Carlos M. Téllez Rodríguez

(57) ABSTRACT

The present disclosure provides a two-part curable composition precursor comprising (a) a first part (A) comprising at least one multifunctional epoxy resin having an epoxy functionality of at least three; and (b) a second part (B) comprising a prepolymer obtained from (i) a first amine-based epoxy curing agent and a second amine-based epoxy curing agent distinct from the first amine-based epoxy curing agent and (ii) at least one epoxy resin.

15 Claims, No Drawings

STRUCTURAL ADHESIVE HAVING SUPERIOR COMPRESSION PROPERTIES

CROSS REFERENCE TO RELATED APPLICATIONS

This application is a national stage filing under 35 U.S.C. 371 of PCT/IB2021/062110, filed Dec. 21, 2021, which claims the benefit of European Application No. 20216247.5, filed Dec. 21, 2020, the disclosure of all of them is incorporated by reference in its/their entirety herein.

FIELD

The present disclosure relates to two-part curable composition precursors, more specifically to the field of epoxy resin based curable shimming or adhesive compositions. The present disclosure further relates to a cured assembly, comprising at least two substrates bonded by the composition as described herein. In another aspect, the present disclosure relates to a method for bonding an aircraft assembly comprising applying the compositions as described herein. In still a further aspect, the present disclosure relates to the use of the curable compositions as described herein.

BACKGROUND

A shim is a thin piece of material used to fill small gaps or spaces between parts to be joined together. Shims assume the shape of the gap and can support a compressive load to prevent undue distortion and damage to structural parts when fastened together, typically using mechanical fasteners. Shims are used in industrial applications, such as in automotive and aerospace manufacturing. Various forms of shims are also used in residential and commercial construction. In the aerospace field, the precision of shim dimensions is especially critical for proper assembly of parts and ensuring structural integrity of the aircraft. Mounting an aerodynamic surface or skin to the internal substructure requires fitting the parts together at mating surfaces without leaving any gaps between the mating surfaces greater than a predetermined allowance. Gaps greater than the predetermined allowance must be filled with a shim to provide a desirable aerodynamic performance and structural integrity.

Various types of shims are available. Solid shims may be made of the same material as the interfacing parts. Laminated peelable shims may be made of foil layers that can be removed one-by-one until a favorable fit is achieved. Liquid shim materials work well in filling irregular or tapered interfaces and are typically used to fill gaps less than 0.7 millimeters in width. Determining the necessity, size, and shape of a given shim is often an iterative and labor-intensive process. Generally, parts are temporarily assembled and then visually inspected and measured for gaps between the skin and substructure. The parts may then be dismantled and a trial shim would be fabricated. The parts may then be reassembled with the shim temporarily secured in place, to check the fit. This is a second temporary assembly operation and such operations may need to be repeated until a proper fit is achieved.

When using liquid shim compositions, the current state of art requires a process with numerous steps. First, a foil with release agent will be placed on the wing cover, then liquid shim will be injected to fill the gap between the rib foot and the wing cover. After curing of the liquid shim, the joint is then opened to remove the foil, apply a separate adhesive, if needed, and inspect for any defects in the cured shim. After this verification is complete, the bond between the parts can be closed again.

Without contesting the technical advantages associated with the shimming composition known in the art for used in particular in aerospace applications, there is still a strong need for curable shimming compositions exhibiting a certain property profile including good mechanical properties required for shimming. Ideally, the known shimming processes would be shortened, and, also desirably, shimming compositions would also be able to actually bond parts together.

Other advantages of the curable compositions and methods of the present disclosure will be apparent from the following description.

SUMMARY

The present disclosure provides a two-part curable composition precursor comprising:

(a) a first part (A) comprising
 at least one multifunctional epoxy resin having an epoxy functionality of at least three; and (b) a second part (B) comprising a prepolymer obtained from (i) a first amine-based epoxy curing agent and a second amine-based epoxy curing agent distinct from the first amine-based epoxy curing agent and (ii) at least one epoxy resin.

The present disclosure also provides a curable composition, obtained from combining part (A) and part (B) of the curable composition precursor as disclosed herein.

Furthermore, the present disclosure provides a composite article comprising a honeycomb structure comprising a plurality of cells filled with a curable void filler composition as described herein or filled with a cured void filler as described herein.

The present disclosure further provides a method of bonding an aircraft assembly comprised of a skin and a substructure, the method comprising:

(I) Mixing the curable composition precursor as described herein to provide a curable shimming composition;

(II) Dispensing the curable shimming composition onto a bonding surface of either the skin or the substructure;

(III) Mating the skin or the substructure whereby the curable shimming composition is disposed therebetween;

(IV) Optionally, securing the skin and the substructure to each other using at least one mechanical fastener extending through the curable shimming composition; and (V) Allowing the curable shimming composition to cure, thereby obtaining a bonded aircraft assembly.

Furthermore, the present disclosure relates to certain uses of the curable compositions described herein in applications of the automotive, commercial transportation and aerospace industries.

DETAILED DESCRIPTION

Before any embodiments of this disclosure are explained in detail, it is to be understood that the disclosure is not limited in its application to the details of construction and the arrangement of components set forth in the following description. The invention is capable of other embodiments and of being practiced or of being carried out in various ways. As used herein, the term “a”, “an”, and “the” are used interchangeably and mean one or more; and “and/or” is used to indicate one or both stated cases may occur, for example A and/or B includes, (A and B) and (A or B). Herein, recitation of ranges by endpoints includes all numbers subsumed within that range (e.g., 1 to 10 includes 1.4, 1.9, 2.33, 5.75, 9.98, etc.). Also herein, recitation of "at least one" includes all numbers of one and greater (e.g., at least 2, at least 4, at least 6, at least 8, at least 10, at least 25, at least 50, at least 100, etc.). Furthermore, it is to be understood that the phraseology and terminology used herein is for the purpose of description and should not be regarded as limiting. Contrary to the use of "consisting", which is meant to be limiting, the use of "including," "containing", "comprising," or "having" and variations thereof is meant to be not limiting and to encompass the items listed thereafter as well as additional items.

Amounts of ingredients of a composition may be indicated by % by weight (or "% wt". or "wt.-%") unless specified otherwise. The amounts of all ingredients gives 100% wt unless specified otherwise. If the amounts of ingredients is identified by % mole the amount of all ingredients gives 100% mole unless specified otherwise.

The terms "solid" and "liquid" refer to ambient conditions (23° C., 1 bar).

Average particle sizes as referred to herein be number averages. In case of particles that are only substantially spherical the particle size is determined by adding the length of the two main (largest orthogonal) axes of the particle and dividing it by two. "Substantially spherical" means one or all main axes (x-, y- or z-axis) may deviate from the required length to form a perfect sphere by up to 50%, preferably up to 25%.

The curable compositions provided herein, preferably, are extrudable pastes. As used above and below, the term "extrudable paste" refers to compositions which have an initial extrusion rate measured as described in the test section below which is at least 50 g/min. More preferably, the initial extrusion rate is from 50 g/min up to 300 g/min.

Unless explicitly stated otherwise, all embodiments and optional features of the present disclosure can be combined freely.

The first aspect of the present disclosure is a two-part curable composition precursor comprising (a) a first part (A) comprising
  at least one multifunctional epoxy resin having an epoxy functionality of at least three; and
(b) a second part (B) comprising a prepolymer obtained from (i) a first amine-based epoxy curing agent and a second amine-based epoxy curing agent distinct from the first amine-based epoxy curing agent and (ii) at least one epoxy resin.

It has been surprisingly found that a curable two-part composition comprising the combination of two different amine-based curing agents in an epoxy prepolymer in the hardener part and a multifunctional epoxy resin in the base part may exhibit a favourable combination of compression properties required for liquid shimming and good adhesive properties, such as good peel strength and shear strength. Also, the two-part curable compositions as described herein are curable at ambient temperatures, which enables applications where curing using heat is not possible, in particular involving applications on large parts of ships, commercial transportation vehicles and aircrafts. Accordingly, the compositions as described herein are particularly suited as liquid shim, such as in aircraft manufacturing. Also, the process of shimming may be shortened or otherwise improved since the compositions as described herein may not serve as shim only, but also as adhesive effectively bonding parts together.

The curable compositions precursors comprise two parts, a base part (A) and a hardener part (B). It is understood that two physically separate parts (A) and (B) are described herein. This has the advantage that higher shelf-life of the compositions is achieved. Until physical combination of the two parts, they remain inherently relative inactive. Only upon combination (which may or may not involve additional mixing), a curable composition is obtained. This curable composition is then ready to apply. Also, this has the advantage that the curable compositions as described herein may be cured at ambient temperatures, which is particularly advantageous, for instance for large parts.

Part (A) of the curable composition precursor as described herein comprises at least one multifunctional epoxy resin having an epoxy functionality of at least three. In general, epoxy resins are polymeric organic compounds having one or more oxirane ring polymerizable by a ring opening reaction. The epoxy-functionalities allow the resin to undertake cross-linking reactions. Such materials, broadly called epoxides, can be cycloaliphatic or aromatic, which means they have one or more unit that is cycloaliphatic or aromatic. Useful materials generally have at least two polymerizable epoxy groups per molecule and, more preferably, from two to four polymerizable epoxy groups per molecule. Typically, the epoxy resins may have an average epoxy-functionality of at least 1, greater than one, or of at least 2.

The epoxy resin is preferably free or essentially free of aromatic amine moieties. The term "essentially free" as used herein means that trace amounts may be present, for example, due to impurities present in the starting materials or as a result of production process. Such trace amounts include less than 10,000 ppm, preferably less than 5,000 ppm, based on the total amount of the composition.

Typically, but not exclusively, the epoxy resins contain repeating units derived from monomers having an epoxy-functionality as described above but epoxy resins can also include, for example, silicone-based polymers that contain epoxy groups or organic polymer particles coated with or modified with epoxy groups or particles coated with, dispersed in, or modified with epoxy-groups-containing polymers.

Mixtures of various epoxy resins may also be used in the compositions of the present disclosure. Epoxy resins may be selected from the group consisting of alkylene oxides, alkenyl oxides, glycidyl esters, glycidyl ethers, epoxy novolacs, copolymers of acrylic acid esters of glycidol and copolymerizable vinyl compounds, polyurethane polyepoxides, and mixtures thereof.

Preferably, the epoxy resins contain moieties of the glycidyl, diglycidyl or polyglycidyl ether type. Such epoxy resins may be obtained, for example, by the reaction of a hydroxyl functionality (for example but not limited to dihydric or polyhydric phenols or aliphatic alcohols including polyols) with an epichlorohydrine-functionality. As referred to herein, dihydric phenols are phenols containing at least two hydroxy groups bonded to the aromatic ring (also referred to as "aromatic" hydroxy groups) of a phenol- or in case of polyphenols at least two hydroxy groups are bonded to an aromatic ring. This means the hydroxyl groups can be bonded to the same ring of the polyphenol or to different rings each of the polyphenol. Therefore, the term "dihydric phenols" is not limited to phenols or polyphenols containing two "aromatic" hydroxy groups but also encompasses polyhydric phenols, i.e. compounds having more than two "aromatic" hydroxy groups. Examples of useful dihydric phenols include resorcinol, catechol, hydroquinone, and polyphenols including p,p'-dihydroxydibenzyl, p,p'-dihydroxyphenylsulfone, p,p'-dihydroxybenzophenone, 2,2'-dihydroxyphenyl sulfone, p,p'-dihydroxybenzophenone, 2,2-dihydroxy-1,1-dinaphrhylmethane, and the 2,2', 2,3', 2,4', 3,3', 3,4', and 4,4' isomers of dihydroxydiphenylmethane, dihydroxydiphenyldimethylmethane, dihydroxydiphenylethylmethylmethane, dihydroxydiphenylmethylpropylmethane, dihydroxydiphenylethylphenylmethane, dihydroxydiphenylpropylenphenylmethane, dihydroxydiphenylbutylphenylmethane, dihydroxydiphenyltolylethane, dihydroxydiphenyltolylmethylmethane, dihydroxydiphenyldicyclohexylmethane, and dihydroxydiphenylcyclohexane.

It is preferred that the at least one epoxy resin comprises at least one aromatic moiety. Preferably, the at least one epoxy resin comprises repeating units derived from bisphenol A and epichlorohydrine, bisphenol F and epichlorohydrine or a combination thereof.

Preferred epoxy resins include epoxy resins containing or consisting of glycidyl ethers or polyglycidyl ethers of monohydric, dihydric or polyhydric phenols, such as for example, but not limited to bisphenol A, bisphenol F, including polymers comprising repeating units of these phenols. Preferred epoxy resins include epoxy novolacs. Epoxy novolacs are the reaction product of an epoxy group-introducing agent, such as for example epichlorohydrin, with a condensation product of a mono- di or polyhydric phenol (which may be alkyl substituted (e.g. cresol) or non-substituted) and an aldehyde, such as for example, formaldehyde. Typical epoxy novolacs are polymers containing glycidyl ether groups and further comprising repeating units derived from bisphenol F or another reaction product of a phenol with an aldehyde. The phenol may be monohydric, dihydric or trihyidric and may be non-substituted or alkyl substituted.

Instead of, or in addition to, the aromatic epoxy resins described above also their fully or partially hydrogenated derivatives (i.e. the corresponding cycloaliphatic compounds) may be used.

The epoxy resins may be liquid at room temperature or solid. Typically, the epoxy resins may have a viscosity of from about 400 mPa·s at 20° C. to about 40,000 mPa·s at 50° C. Preferably, the resin has a viscosity of at least 8,000 mPa·s at 20° C. up to 5,000 mPa·s at 50° C. It is preferred that the at least one epoxy resin as used herein is liquid at room temperature. This is advantageous from a workability point of view.

The at least one epoxy resin preferably does not contain an —$NH_2$ or —$NH_3^+$ functionality. More preferably, the at least one epoxy resin preferably does not contain an aromatic amine moiety, such as for example a unit derived from an aminophenol.

Examples of commercially available epoxy resins include diglycidylether of bisphenol A (e.g. available under the trade designation EPON 828, EPON 830 or EPON 1001 from Hexion Speciality Chemicals GmbH, Rosbach, Germany, or under the trade designation D.E.R-331 or D.E.R-332 from Dow Chemical Co); diglycidyl ether of bisphenol F (e.g. EPICLON 830 available from Dainippon Ink and Chemicals, Inc. or D.E.R.-354 from Dow Chemical Co, Schwalbach/Ts., Germany); silicone resins containing diglycidyl epoxy functionalities; flame retardant epoxy resins (e.g. DER 580, a brominated bisphenol type epoxy resin available from Dow Chemical Co.); Other epoxy resins based on bisphenols are commercially available under the trade designations EPIKOTE (Hexion Speciality Chemicals, Rosbach, Germany), or EPILOX (Leuna Epilox GmbH, Leuna, Germany). Epoxy novolacs are available under the trade designation D.E.N. from Dow Chemical Co, Schwalbach/Ts., Germany, such as for example D.E.N 431 (a novolac resin with an average epoxy functionality of 2.8 and a viscosity of from 1100 to 1700 mPa s at 51.7° C.), D.E.N. 425 a novolac resin with an average epoxy functionality of 2.5 and a viscosity of from 9500 to 12500 mPa s at 25° C., D.E.N. 438 a novolac resin with an average epoxy functionality of 3.6 and a viscosity of from 3100 to 4000 mPa sat 51.7° C.

The curable composition precursor as described herein comprises in part (A) at least one multifunctional epoxy resin. Preferably, the at least one multifunctional resin is selected from triglycidyl ethers, tetraglycidyl ethers and pentaglycidyl ether, preferably from triglycidyl ethers. In this regard, glycidyl ethers of trihydric phenols are particularly preferred. Polyfunctional epoxy resins are commercially available, for example, under the trade designation Tactix such as Tactix 742 (i.e. a triphenylolmethane triglycidyl ether), under the trade designation Araldite (e.g. Araldite MY 0500 or MY721) from the Huntsman Corporation. Preferably, the at least one polyfunctional resin is contained in part (A) in an amount of from 30 to 95 wt.-%, preferably from 40 to 90 wt.-%, more preferably from 50 to 85 wt.-%, based on the total weight of part (A).

The curable composition precursor may further comprise in part (A) and/or in part (B) at least one toughening agents. Any toughening agent, commonly known in the art, may be used in the context of the present disclosure. The toughening agents are preferably selected from a group comprising core-shell toughening agents, CTBNs (carboxyl and/or nitrile terminated butadiene/nitrile rubbers) and high molecular weight amine terminated polytetramethylene oxide.

Core-shell toughening agents which are especially preferred as toughening agents, usually comprise different materials in the inner core region and the outer shell region, respectively. Preferably, the core may be harder than the shell but this is not required. The shell may comprise harder material and/or the shell may be layered in its construction. Most preferably, the inner hard core component is comprised of a single and/or a plurality of organic polymers and inorganic oxides from the first, second and/or third transition series of the periodic table such as silica, alumina, zirconia, and/or naturally occurring minerals such as feldspars, silicates, aluminates, zirconates, and/or other hardened materials such as carbides, nitrides, silicides, aluminides, and/or some combination thereof and therebetween. The outer soft shell component may be comprised of rubbers such as diene, olefin rubbers, natural rubber, polyisoprene, copolymers thereof, ethylene propylene monomer rubber, diene-acrylonitrile copolymers, copolymers of vinyl aromatic monomers, styrene-butadiene copolymers known as SBR rubbers, and terpolymers of dienes with acrylonitrile or unsaturated esters and styrene or vinyl toluene. The soft shell preferably includes modifications with functionalities such as carboxyl, hydroxyl, epoxy, cyanates, isocyanates, amino, and thiol which can react with the epoxy components of the precursor. Core-shell toughening agents which are useful in the thermosettable composition are commercially available, for example, from DOW under the trade designation Paraloid™, or Kane Ace™ MX153 from Kaneka, or Clearstrength™ products from Arkema Alternative core shell material are acrylic impact modifiers from Arkema, with products from the trade name Durastrength. Usually, core-shell toughening agents will be employed as dispersion in epoxy resins.

CTBN toughening agents react through their carboxyl and/or nitrile functional groups with the epoxide component of the precursor during curing thereby introducing their butadiene/nitrile rubber portion as a soft, shock-absorbing segment into the epoxy network forming a hard segment. CTBN toughening agents which are useful in the present invention are commercially available, for example, from Hanse Chemie AG, Hamburg, Germany, under the trade designation Albipox™.

It is preferred that the at least one toughening agent is selected from core-shell rubbers and CTBN rubbers, preferably from core-shell rubbers. Preferably, the at least one toughener comprises core/shell rubbers, preferably dispersed in at least one epoxy resin.

Preferably, the at least one toughening agent is contained in part (A) and/or part (B) of the curable composition precursor as described herein in an amount of from 0.2 to 20 wt.-%, preferably from 0.5 to 15 wt.-%, more preferably from 1 to 10 wt.-%, based on the total weight of part (A) and/or part (B), respectively, preferably of part (A).

Part (B) of the curable composition precursors according to the present disclosure comprises agents for curing the epoxy resins contained in part (A). In this regard, part (B) comprises a prepolymer obtained from (i) a first amine-based epoxy curing agent and a second amine-based epoxy curing agent distinct from the first amine-based epoxy curing agent and (ii) at least one epoxy resin. This has the effect that, in combination with the multifunctional epoxy resin of part (A), the desirable combination of compressive strength and modulus together with good adhesive properties as described herein are achieved. Furthermore, it was found that the compositions according to the present disclosure were much less to the phenomenon known as "amine-blushing" upon curing compared to known adhesive or shimming compositions. This improved outer appearance is also advantageous during manufacture in the aerospace industry. As prepolymer, it is understood that it was formed by the two amine-based epoxy curing agents and the epoxy resin undergoing a chemical reaction. The formation of amine/epoxy prepolymers is well-known in the art. The epoxy resin used in the prepolymer of part (B) may be any epoxy resin as already described herein under part (A). Preferably, the at least one epoxy resin is selected from liquid epoxy resins, such as selected from bisphenol A and/or bisphenol F based epoxy resins.

With regard to the amine-based curing agents, it is understood that they comprise amine moieties and/or amine-based moieties able to react with epoxy functions. In particular, it is preferred that they contain at least one, preferably at least two primary amino groups ($-NH_2$ groups) at a terminal position. Most preferred embodiments contain two primary amino groups and both are at the terminal position of the molecule. Examples of readily available amine-based curing agents include but are not limited to cyclohexanes containing one or more terminal primary amino groups and/or aminoalkyl residues with one or more terminal primary amino groups, piperazines containing one or more terminal primary amino groups and/or aminoalkyl residues with one or more terminal primary amino groups, and morpholines containing one or more terminal primary amino and/or aminoalkyl groups with terminal primary amino groups. Particular examples include but are not limited to bis or tris aminoalkyl piperazines or morpholines. Specific examples include, but are not limited to, 1-amino-3-aminomethyl-3,5,5-trimethylcyclohexane (also called isophorone diamine) and N,N-bis(3 aminopropyl) piperazine. The amine-based curing agents may be aliphatic cyclic (poly)amines as described above or they may be adducts of such aliphatic cyclic polyamines with one or more epoxy resins, with the proviso that the aliphatic cyclic polyamines are used in molar excess to ensure the adducts contain at least two primary amine groups, preferably at a terminal position of the adduct. Preferably, the epoxy resin used to form the adduct is the same or a similar one to one of the epoxy resins already described herein. Useful aliphatic amines need not be cyclic and can include linear and/or branched polyetheramines. The unbranched polyetheramine can have a molecular weight of from 100 g/mol to 500 g/mol, from 120 g/mol to 400 g/mol, from 130 g/mol to 300 g/mol, or in some embodiments, less than, equal to, or greater than 130 g/mol, 140, 150, 160, 170, 180, 190, 200, 220, 250, 270, 300, 320, 350, 370, 400, 420, 450, 470, or 500 g/mol. The unbranched polyetheramine can have between one and four ether oxygens and more typically two or three ether oxygens. In some embodiments the unbranched polyetheramine may be a compound according to Formula I:

$$H_2N—[(CH_2)_xO]_y—(CH_2)_x—NH_2 \quad [I]$$

wherein y is selected from 1, 2, 3 or 4, and wherein each x is independently selected from 2, 3, or 4. In some embodiments the unbranched polyetheramine may be 4,7,10-trioxa tridecane 1,13-diamine (TTD). In some embodiments the unbranched polyetheramine may be 4,7-dioxadecane 1,10-diamine, commercially available as JEFFAMINE EDR 176. A further polyetheramine useful in the context of the present disclosure is Baxxodur EC-130.

It is preferred, however, that the second amine-based epoxy curing agent exhibits a larger molecular weight than the first amine-based epoxy curing agent. Preferably, the second amine-based epoxy curing agent exhibits a molecular weight of at least 120 g/mol, preferably of at least 130 g/mol, more preferably of at least 140 g/mol. Similarly, it is preferred that the second amine-based epoxy curing agent exhibits a higher amine hydrogen equivalent weight than the first amine-based epoxy curing agent. Preferably, the second epoxy-curing agent exhibits an amine hydrogen equivalent of at least 48 g/eq, preferably of at least 50 g/eq, and more preferably of at least 52 g/eq. It is also preferred that the first amine-based epoxy curing agent and/or the second amine-based epoxy curing agent are selected from alkyl amines and/or alkoxy amines. Preferably, the first amine-based epoxy curing agent and/or the second amine-based epoxy curing agent are selected from polyetheramines and/or polyamidoamines, preferably from polyetheramines. Preferably, the second amine-based epoxy curing agent is trioxadecane diamine, and the first amine-based epoxy curing agent is selected from polyetheramines. It was also found that cycloaliphatic amines did not yield favourable results when used in the compositions as described herein. Accordingly, it is preferred that the first amine-based epoxy curing agent and/or the second amine-based epoxy curing agents are no cycloaliphatic amine-based epoxy curing agents, and further preferred, that no cycloaliphatic amine-based epoxy curing agents are present in part (B). With regard to the ratio of the first and second amine-based epoxy curing agents used in the prepolymer of part (B) of the compositions as described herein, it is preferred that the first amine-based epoxy curing agent and the second amine-based epoxy curing agent are used in a ratio in the range of from 4:1 to 1:4, preferably from 3:1 to 1:3, more preferably from 2:1 to 1:2. Using higher or lower ratios could lead to the result of not achieving the desirable combination of compressive and adhesive properties of the compositions as described herein. With regard to the amount of the prepolymer, it is preferred that the prepolymer is present in part (B) in an amount in the range of from 20 to 90 wt.-%, preferably from 30 to 80 wt.-%, more preferably from 40 to 70 wt.-%, based on the total weight of part (B).

In addition, the curable compositions as described herein may further comprise at least one curing accelerator. This curing additive is also able to cross-link epoxides, but is present in a much smaller amount than the above-described epoxy curing agent and may add to the curing speed of the composition. Typical curing accelerators known in the art include boron trifloride or trichloride amine complexes, imidazoles, imidazole derivatives, imidazole-like compounds and the like. Preferably, the at least one curing accelerator is selected from earth alkaline nitrates, earth alkaline triflates, alkaline nitrates, alkaline triflates, tertiary amines, preferably aromatic tertiary amines, and any combinations and mixtures thereof. The at least one cure accelerator is preferably present in part (B) in an amount in the range of from 1 to 15 wt.-%, preferably from 2 to 13 wt.-%, more preferably from 3 to 10 wt.-%, based on the total weight of part (B).

It was found that the performance of the curable compositions as described herein could be further improved by adding further ingredients and adjuvants such as inorganic filler materials and/or liquid rubbers to either or both of part (A) and part (B). Preferably, part (A) and/or part (B), preferably part (A), further comprise at least one liquid rubber. Liquid rubbers are well-known in the art for compounding epoxy resin compositions. Preferred examples include copolymers of amine terminated butadieneacrylonitrile compounds. Such compounds are commercially available, for example, under the trade designation Hypro (e.g. Hypro 1300X45 ATBN). Preferably, the at least one liquid rubber is contained in part (A) and/or part (B), preferably part (A), in an amount in the range of from 1 to 40 wt.-%, preferably from 5 to 35 wt.-%, more preferably from 8 to 30 wt.-%, based on the total weight of part (A) or part (B), preferably part (A).

It is further preferred that part (A) and/or part (B) further comprise at least one inorganic filler compound. Preferably, the at least one inorganic filler compound is selected from silica, carbon fibers, glass fibers, ceramic fibers, ceramic spheres, glass spheres, glass bubbles, carbon black, intumescent inorganic compounds, sand, and any mixture or combination thereof. For example, an inorganic filler may be used to enhance the compressive strength of the cured shimming adhesive. Many useful inorganic fillers are possible. Examples include naturally occurring or synthetic materials such as silicon dioxide; nitrides (e.g., silicon nitride); glasses and fillers derived from, for example, Zr, Sr, Ce, Sb, Sn, Ba, Zn, and Al; feldspar; borosilicate glass; zirconia; titania; and micrometer and sub-micrometer fumed silica particles (e.g., pyrogenic silicas such as those available under the trade designations AEROSIL, including "OX 50," "130," "150" and "200" silicas from Degussa Corp., Akron, Ohio and CAB-O-OSIL M5 silica from Cabot Corp., Tuscola, IL). In a preferred embodiment, the inorganic filler includes fumed silica. The fumed silica optionally has a median particle size in the range of from 1 to 10 micrometers. The at least one inorganic filler may be present in part (A) and/or part (B) in an amount in the range of from 5 to 50 wt.-%, preferably from 8 to 40 wt.-%, more preferably from 10 to 30 wt.-% based on the total weight of the respective part (A) or (B).

The ratio of part (A) to part (B) in the curable composition precursors according to the present disclosure may be in the range of from 10:1 to 1:5, preferably from 8:1 to 1:2, more preferably from 6:1 to 1:1. Due the combination of properties, the curable composition precursor as described herein is a shimming composition precursor and/or adhesive composition precursor. Part (A) and (B) may be stored in separate containers, such as well-known extruding tubes. Upon extruding through a common mixing nozzle, parts (A) and (B) are combined and mixed, thereby forming a ready-to-use curable composition. Preferably, the curable composition obtained from combining part (A) and part (B) is a curable shimming composition and/or a curable adhesive composition. In this regard, it is preferred that the curable composition provides upon curing a compressive strength at 90° C. of at least 60 MPa, preferably of at least 70 MPa, and more preferably of at least 75 MPa. It is also preferred that the curable composition provides upon curing a compressive modulus at 90° C. of at least 800 MPa, preferably of at least 900 MPa, and more preferably of at least 1000 MPa. Compositions exhibiting compressive strength and compressive modulus in these ranges are excellently suited for applications as shim, in particular as liquid shim. Both compressive modulus and strength may be determined according to ISO 604 as described in the experimental section. Furthermore, it is preferred that wherein the curable composition provides upon curing a peel strength according to EN2243-2:2006 of at least 130 N/25 mm, preferably of at least 140 N/25 mm, and more preferably of at least 150 N/25 mm. A curable composition able to provide this peel strength is considered to exhibit good adhesive properties, i.e. a shimming composition according to the present disclosure having this peel strength is not only providing a shimming, but is also able to adhesively bond parts together. The curable compositions as described herein may be able to provide these properties even when cured at ambient temperature, which is considered a major advantage for a number of industrial applications.

Accordingly, the present disclosure further provides a bonded assembly, comprising at least two substrates and the cured composition as described herein disposed between bonding surfaces of the at least two substrates. That is, the bonding surfaces of the at least two substrates are adhesively bonded by the cured composition according to the present disclosure. The substrates may be structural or body elements of an aircraft, a commercial transportation vehicle, a ship, or even a building. For example, the substrates may be selected from a substructure, a structural element, a skin, of a wing, a rudder or an interior part of an aircraft, or a structural element and a skin of a car or a commercial transportation vehicle.

The present disclosure further provides method of bonding an aircraft assembly comprised of a skin and a substructure, the method comprising:

(I) Mixing the curable composition precursor as described herein to provide a curable shimming composition;

(II) Dispensing the curable shimming composition onto a bonding surface of either the skin or the substructure;

(III) Mating the skin or the substructure whereby the curable shimming composition is disposed therebetween;

(IV) Optionally, securing the skin and the substructure to each other using at least one mechanical fastener extending through the curable shimming composition; and (V) Allowing the curable composition to cure, thereby obtaining a bonded aircraft assembly.

Preferably, curing in step (V) comprises allowing to curable composition to cure at ambient temperature. This is particularly advantageous when larger parts, such as parts of aircrafts, are involved. Also, curing at ambient temperatures also means that no heating is necessary, which is advantageous from both an ecologic and economic point of view.

Furthermore, the present disclosure provides a use of the curable composition precursor or of the curable shimming composition as described herein in manufacturing and repair operations in the automotive, aerospace, commercial transportation and/or ship building industry, preferably in the aerospace industry. In this regard, it is preferred that the use is an application as shim in the automotive, aerospace, commercial transportation and/or ship building industry, preferably in the aerospace industry. In particular, it is preferred that the use is application as shim and/or adhesive in the aerospace industry, preferably as shim and adhesive in the aerospace industry.

The curable compositions of the disclosure can be readily prepared by a number of techniques. For example, the various components may be added under ambient conditions to a suitable mixing vessel, such as a Mogul mixer. The vessel is preferably cooled to prevent reaction of the components during preparation and to facilitate removal of any heat generated during manufacture. Preferably the curable composition (also referred to herein as "void filler") is mixed at a temperature of less than 35° C. Additionally, slow mixing speeds are generally used to help prevent heat build-up in the mixer. Mixing is continued until the components form a homogeneous mixture, after which time the precursor is removed from the mixer.

EXAMPLES

The present disclosure is further described without however wanting to limit the disclosure thereto. The following examples are provided to illustrate certain embodiments but are not meant to be limited in any way. Prior to that some test methods used to characterize materials and their properties will be described. All parts and percentages are by weight unless otherwise indicated.

Materials Used:

| Trade name | Description | Supplier |
|---|---|---|
| Epikote 828 | Standard liquid resin | Hexion |
| Epikote 232 | Bisphenol A/F epoxy resin | Hexion |
| D.E.R. 331 | Standard BPA based epoxy resin | Olin |
| Araldite MY 0500 | Multi-functional epoxy resin | Huntsman |
| Kane Ace MX257 | Impact modifier | Kaneka |
| Tactix 742 | Tri-functional epoxy resin | Huntsman |
| Araldite MY 721 | Multi-functional epoxy resin | Huntsman |
| Epodil 757 | Reactive diluent | Hexion |
| Epoxy Silane | Wetting and adhesion promotion | Degussa |
| Eponex 1510 | Hydrogenated epoxy resin | Hexion |
| Eurocell | Vulcanic Rock | Europerl |
| Aerosil R202 | Sag resistance | Degussa |
| FusSil SF 20 | Fused Silica | 3M |
| Baxxodur EC130 | Curing agent - Polyether amine | Air Products |
| Jeffamine EDR 176 | Curing agent - Polyether amine | Huntsman |
| Hypro 1300X45 | Amine terminated butadiene rubber | CVC Chemicals |
| Ancamine K54 | Cure accelerator | Air Products |

Test Methods

Compressive Strength 200 g of the curable composition were cast into a release-coated mould having the dimensions of 12.5 mm (height)×12.5 mm (width)×25 mm (length) and being open on one major side. The samples were left to cure at room temperature for about one week.

All test specimens were compressed along their 25 mm axis at a rate of 0.5 mm/min by using a Zwick Model Z050 Tensile Tester (Zwick GmbH & CO., Ulm, Germany), equipped with heating capability, in accordance to the methods of ISO 604:2002.

For testing at elevated temperature (i.e., 90° C.), the specimens were preconditioned at that temperature for at least fifteen minutes prior to testing.

Six samples were measured for each epoxy composition. The results were averaged and recorded in M Pa.

Compression Modulus Test

Cylindrical samples of 2.54 cm (1-inch) length and 1.27 cm (0.5-inch) diameter were prepared by injecting mixed product in a silicone mold. The samples were left to cure at room temperature for one week. Compression modulus tests were performed in accordance to the methods of ISO 604:2002 at test speed of 0.127 cm/min (0.05 inch/min) for each composition. Five specimens were tested for each composition and the average value was recorded. For testing at elevated temperature (i.e., 90° C.), the specimens were preconditioned at that temperature for at least fifteen minutes prior to testing.

Floating Roller Peel (FRP) Strength Test

The methods of EN2243-2:2006 were followed. Etched panels of 2024-T3 bare aluminum measuring 20.3 cm×7.6 cm×0.16 cm, and 25.4 cm×7.6 cm×0.064 cm, were prepared for testing as described above under "Panel Preparation". An adhesive corresponding to the example or comparative example was applied onto etched panels of 2024-T3 bare aluminum measuring 20.3 cm×7.6 cm×0.16 cm. Primed 25.4 cm×7.6 cm×0.064 aluminum panel was then applied over a 20.3 cm×7.6 cm×0.16 cm panel on which the adhesive was already applied. The assembly was then pressed between metal blocks at an approximate pressure of 13.8 to 34.5 KPa. The panel assembly was cured at ambient temperature for 72 hours, then evaluated for floating roller peel strength in accordance with ASTM D-3167-76 with the following modification. Three samples were tested for each example or comparative example and the average value (in N/25 mm) was reported. Test strips measuring 1.27 cm wide were cut along the lengthwise direction of the bonded aluminum panels. The test was conducted at a rate of 30.5 cm/minute at ambient temperature. In each test, the thinner substrate was peeled from the thicker one, and the results normalized to a width of 25 mm.

Overlap Shear Strength

Overlap shear strength was determined according to European Standard EN 2243-1 (issue 04-2007).

Lap shear specimens were made using 2024-T3 etched aluminum panels. The curable sealant was applied to one edge of each of the two panels (i.e., adherents) using a scraper. Bond area was 12.5 mm×25 mm per sample. Spacers were used to control the thickness of the sealant layer. Glass beads (125-150 μm in diameter) within the sealant served as spacers. The bond was closed and the samples were cured for 4 h at room temperature (23+/−2° C.) under the press (110 kPa) followed by 2 h @ 65° C.

The bonds were tested to failure at room temperature (23+/−2° C.) or at elevated temperature (85+/−2° C.) using a crosshead displacement rate of 10 mm/min. The failure load was recorded, and the lap width was measured with a vernier caliper. The quoted lap shear strengths were calculated as failure load/(measured width of the bond x measured length of the bond). The average and standard deviation were calculated from the results. The overlap shear strength (OLS) values are recorded in Mega Pascal (MPa) and are an average of the results obtained with 3 samples.

Different prepolymers were synthetized used in the formulation of hardener part. The weight percent of each raw material is given the table below:

TABLE 1

Prepolymers for part B of Example 1 and Comparative Examples 1 and 2.

| | Prepoly-A (Comp. Ex. 1) | Prepoly-B (Ex. 1) | Prepoly-C (Comp. Ex. 2) |
|---|---|---|---|
| Baxxodur EC130 | 79.2 | 39.6 | 0 |
| Jefffamine EDR 176 | 0 | 39.6 | 79.2 |
| Epikote 828 | 20.8 | 20.8 | 20.8 |

The 4 Pre-polymers were used to formulate three different 4 Part B (Hardener part) according to the following compositions:

Formulation of Part B:

TABLE 2

Composition of part A of Ex. 1 and Comp. Ex. 1 and 2.

| Formula | Comp. Ex. 1 | Ex. 1 | Comp. Ex. 2 |
|---|---|---|---|
| Prepoly-A | 58 | 0 | 0 |
| Prepoly-B | 0 | 58 | 0 |
| Prepoly -C | 0 | 0 | 58 |
| Liquid Rubber | 17 | 17 | 17 |
| Cure accelerator | 6 | 6 | 6 |
| Filler | 19 | 19 | 19 |

Part A was kept constant and used as base resin part. The composition of part A is as follow:

TABLE 3

Composition of part (A) of examples and comparative examples.

| Raw Material | Weight % |
|---|---|
| Liquid epoxy resin | 4 |
| Multifunctional epoxy | 70 |
| Toughened Epoxy resin | 12 |
| Adhesion promoter | 1 |
| Fillers | 13 |

Evaluation:

To evaluate above compositions each part A was mixed with part B at mix ratio of 1 part B to 2 part A by volume. In first step all compositions were compared in term compression properties as well as floating roller peel test. High peel strength value indicates excellent bonding characteristics whereas high compression values indicate superior shimming capabilities. Compression properties were determined by measuring compression modulus and compression strength at elevated temperature (90° C.). All Samples were cured for 7 days at 23° C. before testing.

The following table summarize screening test results of the different formulations:

TABLE 4

Test results for Ex. 1 and Comp. Ex. 1 and 2.

| Formula | Comp. Ex. 1 | Ex. 1 | Comp. Ex. 2 |
|---|---|---|---|
| Comp. modulus at 90° C. | 650 MPa | 1100 MPa | 1400 MPa |
| Comp. Strength at 90° C. | 54 MPa | 83 MPa | 95 MPa |
| Peel Test at RT | 170N/25 mm | 166N/25 mm | <10N/25 mm |

As evident from table 4, Comp. Ex. 1 showed good peel strength, but lacked performance in the compression tests. While Comp. Ex. 2 did show good compressive strength and modulus, it lacked peel strength, i.e. adhesive properties. However, ex. 1 according to the present disclosure showed a favourable combination of compressive modulus, compressive strength and peel strength.

TABLE 5

Prepolymers for Ex. 2 and Comp. Ex. 3.

| | Prepoly-D (Ex. 2) | Prepoly-E (Comp. Ex. 3) |
|---|---|---|
| Baxxodur EC130 | 39.6 | 0 |
| Jeffamine EDR 176 | 39.6 | 76.4 |
| D.E.R. 331 | 20.8 | 23.6 |

The two Pre-polymers were used to formulate 5 different Part B (Hardener part, Example 1 & Comparative Example 1-4). Comparative Example 4 uses the raw compounds Baxxodur EC-130 and Jeffamine EDR 176 without prior adduct formation. The formulations were composed according to the following table:

TABLE 6

Part (B) of Ex. 2 and Comp. Ex. 3 and 4.

| Formula | Example 2 | Comp. Ex. 3 | Comp. Ex. 4 |
|---|---|---|---|
| Prepoly-D | 58 | 0 | 0 |
| Prepoly -E | 0 | 58 | 0 |
| Baxxodur EC-130 | 0 | 0 | 29 |
| Jeffamine EDR 176 | 0 | 0 | 29 |
| Liquid Rubber | 17 | 17 | 17 |
| Cure accelerator | 6 | 6 | 6 |
| Filler | 19 | 19 | 19 |

Evaluation:

To evaluate above compositions each part A was mixed with part B at mix ratio of 1 part B to 2 part A by volume. All compositions were compared regarding compression properties (Strength/Modulus), floating roller Peel as well as Overlap Shear with 3 specimens per group (n=3). All materials were cured for 7 days at room temperature before testing. The results are summarized in table 7.

TABLE 7

Results of tests of Ex. 2 and Comp. Ex. 3 and 4.

| Formula | Ex. 2 | Comp. Ex. 3 | Comp. Ex. 4 |
|---|---|---|---|
| Comp. strength at 23° C. [MPa] | 62 | 65 | 66 |
| Comp. strength at 90° C. [MPa] | 75 | 86 | 76 |
| Comp. modulus at 23° C. [MPa] | 2125 | 2162 | 2220 |
| Comp. modulus at 90° C. [MPa] | 1100 | 742 | 1076 |
| Peel Test at −55° C. [N/25 mm] | 42 | 3 out of 3 pretest-failure | 3 out of 3 pretest-failure |
| Peel Test at 23° C. [N/25 mm] | 157 | 10 | 28 |
| Overlap Shear at 23° C. [MPa] | 29 | 25 | 27 |
| Overlap Shear at 90° C. [MPa] | 20 | 19 | NA |

As can be seen all formulations showed comparable compression properties. However, Example 2 showed in comparison excellent peel properties between −55 to 23° C. compared to Comp. Ex. 3 and 4. It is quite obvious that Prepoly-E with/without additional Baxxodur EC-130/Jeffamine EDR-176 as well as the raw amine formulation (Comp. Ex. 4) showed poor peel results which is not acceptable for a material to work as an adhesive. Furthermore, upon inspection with the naked eye, it was found that the cured samples of Ex. 1 and 2 did not show amine blushing, whereas the sample of the Comparative Examples did show some amine blushing. In summary, the compositions according to Ex. 1 and Ex. 2 are excellently suited for use as a liquid shim-/adhesive hybrid material.

The invention claimed is:

1. A two-part curable composition precursor comprising:

a first base part (A) comprising epoxy resins that include at least one multifunctional epoxy resin having an epoxy functionality of at least three, other than an epoxy novolac resin; and a second hardener part (B) comprising a prepolymer for curing the epoxy resins in part (A), which is obtained from reacting (i) a combination of a first amine-based epoxy curing agent and a second amine-based epoxy curing agent with (ii) at least one epoxy resin, where the second amine-based epoxy curing agent is distinct from the first amine-based epoxy curing agent and exhibits an amine hydrogen equivalent weight of at least 48 g/eq, wherein in part (B), the first amine-based epoxy curing agent and the second amine-based epoxy curing agent comprise amine moieties or amine-based moieties able to react with epoxy functions; and wherein in part (B), the second amine-based epoxy curing agent exhibits a higher molecular weight and a higher amine hydrogen equivalent weight than the first amine-based epoxy curing agent.

2. The two-part curable composition precursor according to claim 1, wherein in part (A), the at least one multifunctional epoxy resin is selected from triglycidyl ethers, tetraglycidyl ethers and pentaglycidyl ethers.

3. The two-part curable composition precursor according to claim 2, wherein in part (A), the at least one multifunctional epoxy resin is a triglycidyl ether.

4. The two-part curable composition precursor according to claim 1, wherein in part (B), the second amine-based epoxy curing agent exhibits a molecular weight of at least 120 g/mol.

5. The two-part curable composition precursor according to claim 4, wherein in part (B), the second amine-based epoxy curing agent exhibits a molecular weight of at least 140 g/mol.

6. The two-part curable composition precursor according to claim 1, wherein in part (B), the first amine-based epoxy curing agent, the second amine-based epoxy curing agent, or both are selected from polyetheramines and polyamidoamines.

7. The two-part curable composition precursor according to claim 1, wherein in part (B), the second amine-based epoxy curing agent exhibits an amine hydrogen equivalent weight of at least 52 g/eq.

8. The two-part curable composition precursor according to claim 1, wherein in part (B), the first amine-based epoxy curing agent, the second amine-based epoxy curing agent, or both are not cycloaliphatic amine-based epoxy curing agents.

9. The two-part curable composition precursor according to claim 1, wherein in part (B), the prepolymer for curing the epoxy resins is present in an amount of from 20 to 90 wt.-% based on the total weight of part (B).

10. The two-part curable composition precursor according to claim 1, wherein in part (A), the at least one multifunctional epoxy resin is present in an amount of from 30 to 95 wt.-% based on the total weight of part (A).

11. The two-part curable composition precursor according to claim 1, which is a shimming composition precursor and/or an adhesive composition precursor.

12. A curable composition, obtained by combining part (A) and part (B) of the two-part curable composition precursor according to claim 1.

13. A bonded assembly, comprising at least two substrates and a cured composition disposed between bonding surfaces of the at least two substrates, wherein the cured composition is a cured product of the curable composition according to claim 12.

14. A method for bonding two substrates comprising providing the curable composition according to claim 12, and contacting the two substrates with the curable composition.

15. A method of bonding an aircraft assembly comprised of a skin and a substructure, the method comprising:

(I) preparing a curable composition by combining part (A) and part (B) of the two-part curable composition precursor according to claim 1;

(II) dispensing the curable composition onto a bonding surface of either the skin or the substructure;

(III) mating the skin with the substructure whereby the curable composition is disposed therebetween;

(IV) optionally, securing the skin and the substructure to each other using at least one mechanical fastener extending through the curable composition precursor; and (V) allowing the curable composition to cure, thereby obtaining a bonded aircraft assembly.

* * * * *